July 16, 1935.  W. C. LAUGHLIN  2,008,507
APPARATUS AND SYSTEM FOR TREATING SEWAGE
Filed Feb. 17, 1933  2 Sheets-Sheet 1
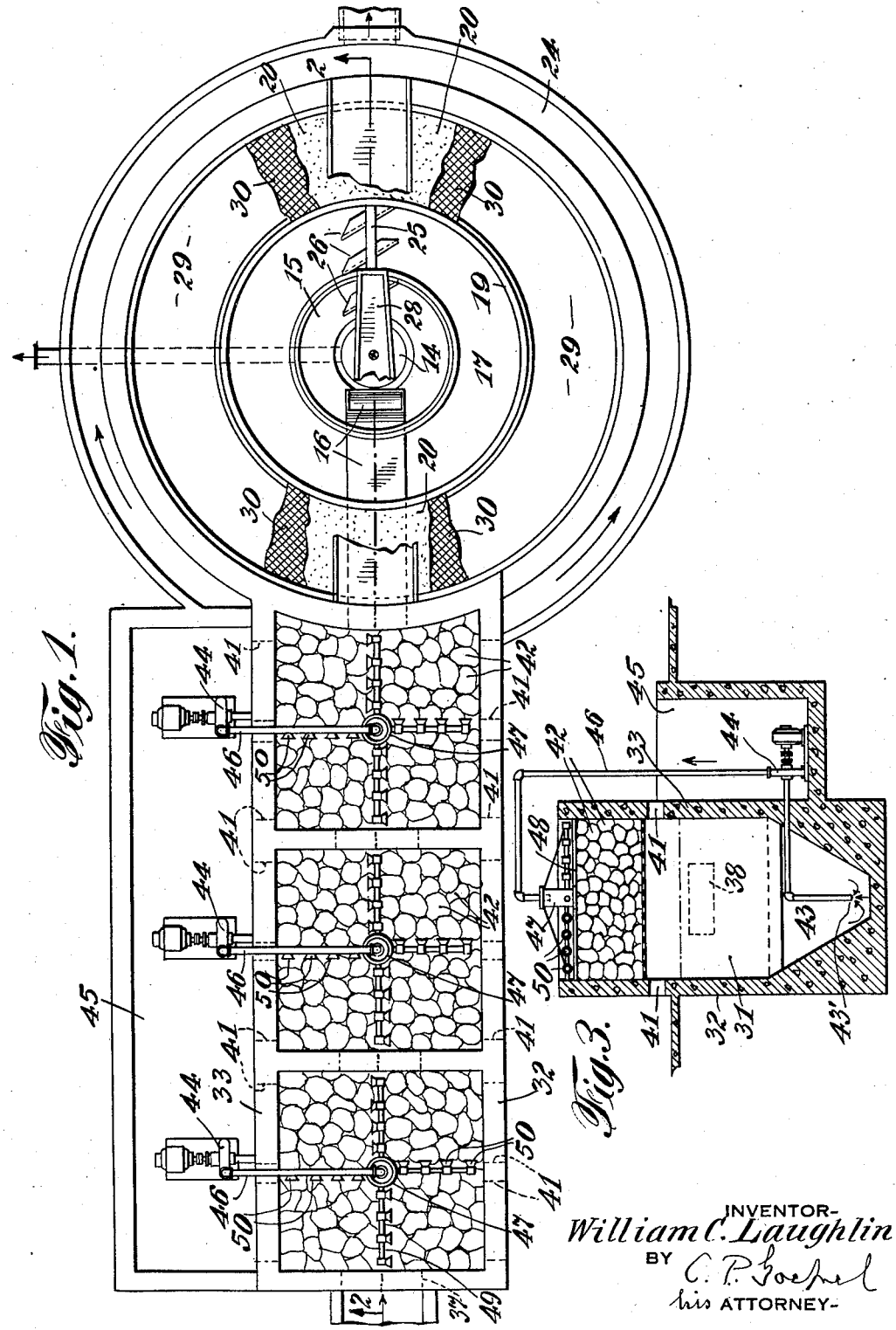
INVENTOR-
*William C. Laughlin*
BY *C. P. Goepel*
his ATTORNEY-

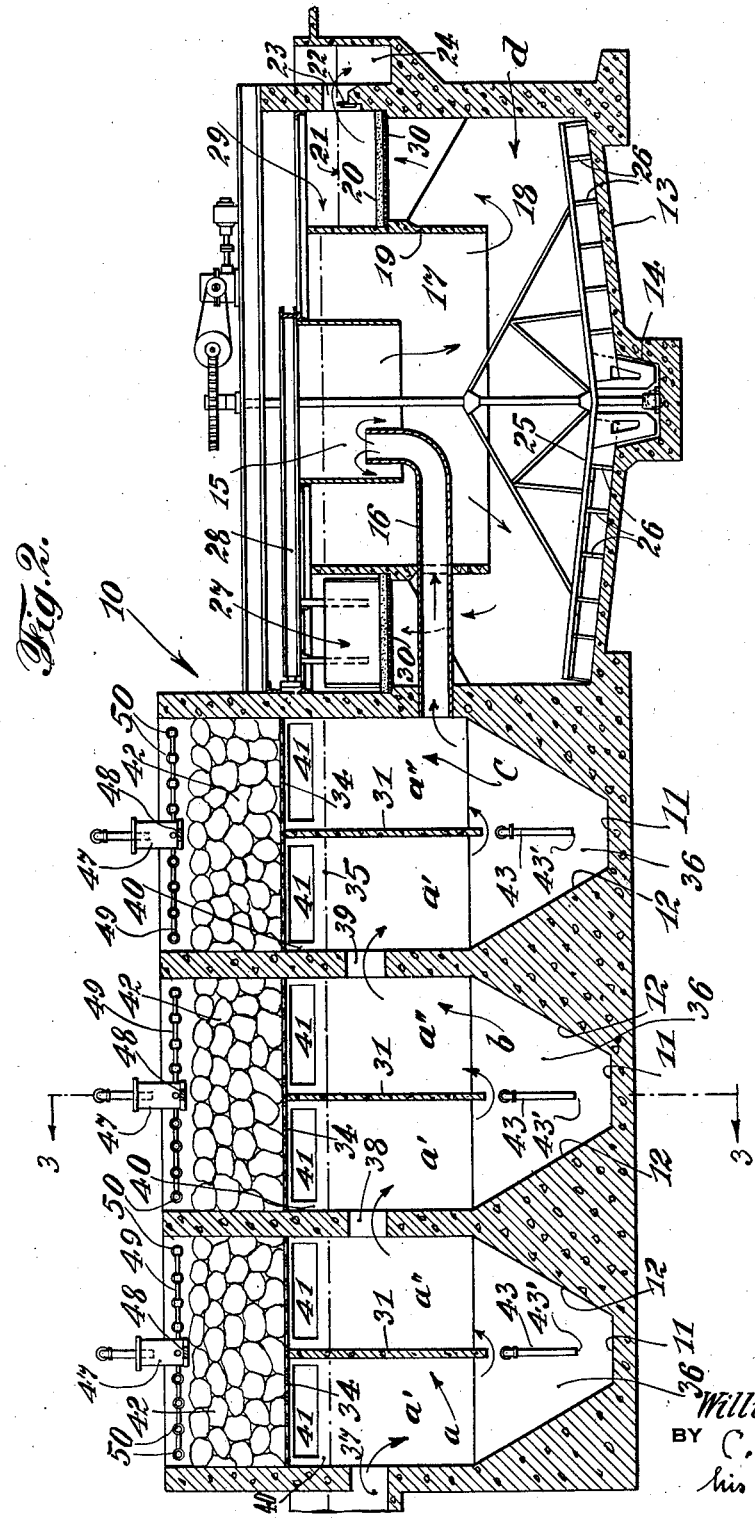

Patented July 16, 1935

2,008,507

UNITED STATES PATENT OFFICE 2,008,507

APPARATUS AND SYSTEM FOR TREATING SEWAGE

William C. Laughlin, Kew Gardens, N. Y., assignor, by mesne assignments, to Filtration Equipment Corporation, New York, N. Y., a corporation of Delaware Application February 17, 1933, Serial No. 657,241

8 Claims. (Cl. 210—8)

This invention relates to apparatus for the treatment of sewage, and has for its purpose and object to provide an improved apparatus and system of this character whereby to aerate the whole body of sewage and liquid and to increase and facilitate bacterial action therein.

In the treatment of sewage and other decaying matter, it is well known that putrefactive products are formed only under conditions of substantial oxygen exhaustion. In carrying out my invention, in order to avoid putrefaction and to maintain rapid oxidation, every part of the sewage and liquid is practically constantly and successively exposed to oxygen, such exposure being in part at certain times to currents of air and in part at other times to free dissolved oxygen in the bulk of sewage. It is the object of my apparatus and system to maintain an actual rate of solution of oxygen from the air to the sewage and liquid, accomplished by aerating sewage under conditions in which bacterial cultures are given a growth period while exposed to currents of air.

To this end and in accordance with the principles of my invention, I may employ sedimentation sewage or other sewage sludge or fluid, prior to passing the same into the sedimentation or clarification tank, as a film action culture sewage or sludge processed by special aeration or re-aeration treatment so as to be furnished with abundance of free dissolved oxygen and with masses of fertilized or active bacterial cultures which of themselves constitute good oxygen carriers. In short, in order to secure rapid oxidation and sedimentation without putrefaction within the sedimentation tank or otherwise, I make provision for introducing into such tank, constantly or successively, copious amounts of free dissolved oxygen and masses of enlivened bacterial cultures carrying their own oxygen. The oxidized film action sludge with masses of enlivened bacteria moves down through the bulk of activated sewage in the tank providing an abundant and continuous absorption action. This results in rapid oxidation re-action, and if the bulk activated sewage be furnished with re-agents (such for instance as described in United States Patent No. 1,877,623, granted September 13, 1932, to William C. Laughlin), capable of producing a precipitate having coagulating and sedimentizing characteristics, there will be a rapid settling to the bottom of the tank of the slimy colloidal matter held in suspension in the bulk activated sewage. The desired chemical changes in the bulk of sewage are hastened and facilitated by increasing the bacterial action therein and by constantly supplying new masses of bacteria furnished with an abundance of oxygen.

Another object and purpose of the invention is to provide a system or arrangement in which the sewage and sludge under treatment will be subjected to new cycles of activity in respect of supplying or replenishing both the free dissolved oxygen and the oxygen-carrying bacterial cultures. These cycles may take the form of successive zones of aeration, forced bacterial growth, activation and flocculation.

More particularly, I may provide above or adjacent the sedimentation chamber a culture-growth bed for the multiplication by growth and division of the cultures, and this bed in order to comprise a medium most favorable for the development of the cultures may consist of trap rock or other suitable coarse material for the multiplication and growth of the cultures in an oxidized film action of sewage sludge distributed or sprinkled to pass downwardly upon and between the rocks, with the crevices and gaps between the rocks forming air channels for exposing the sewage sludge and cultures to currents of air. The downwardly moving sewage sludge and fluid sweeps off and carries with it masses of cultures to fall into the sedimentation tank. Additional oxygen is supplied to the falling sewage and cultures in an air space intervening between the trap rock and the contents of the sedimentation tank.

The cycles of treatment may comprehend a succession of units each consisting of a sedimentation chamber and a trap rock bed or equivalent above or adjacent the chamber, together with means for pumping out the sewage or sludge settlings, or both, in each chamber and sprinkling the same over the trap rock bed. In this system, the sedimentation chambers are arranged in succession so that the lighter liquids which rise in the chambers can pass as by stream flow through the several chambers.

The system also includes a clarification tank which receives the stream flow from the final sedimentation chamber and which is furnished with a filter bed and filter bed cleaning means to produce a clear and purified effluent adapted and fit, upon chlorination or other suitable treatment, to be passed into flowing streams.

The nature of the general principles and objects above referred to, as well as other and additional objects and advantages which will become apparent as the description proceeds, and the manner and system in which they may be embodied in practical form and means are explained in the following detailed description of the particular apparatus herein illustrated by way of example, and to which reference is now directed.

In the accompanying drawings:

Figure 1 is a top plan view of an apparatus constructed in accordance with my invention, certain of the parts of the clarification tank shown at the right-hand end of the figure being broken away;

Fig. 2 is a longitudinal sectional view, taken on the line 2—2 of Fig. 1; and

Fig. 3 is a cross sectional view taken on the line 3—3 of Fig. 2.

For the purpose of illustration, my invention is shown in connection with an elongated structure which is denoted in general by the reference character 10 and which may be produced from concrete or any other suitable well-known or approved material. This structure may be divided, as shown, into sedimentation chambers a, b and c arranged in succession, and a clarification chamber d following the last or final sedimentation chamber c. The lower portions of each of the sedimentation chambers a, b and c may be and preferably are, narrowed toward the bottom 11, the side walls 12 for this purpose sloping inwardly toward one another as they proceed downwardly to the bottom 11.

The clarification chamber d may be of circular form as shown, and provided with a sloping bottom 13 which slopes downwardly all around to a central circular zone or sump 14. This circular form of clarification chamber conveniently provides for a central liquid head 15 which receives its supply through a pipe 16 leading from the final sedimentation chamber c. From the head 15, the sewage liquid passes downwardly through a chamber 17 into the main clarification chamber 18 and thence upwardly around the circular baffle wall 19 and through a filter bed 20 to a liquid level as 21 so that the clear effluent may pass over weirs as 22 arranged in suitable outlets 23 for discharge into the exterior launder 24. This form and arrangement of the clarification chamber provides for the use of a rotary scraper device 25 provided with series of angular scrapers 26 adapted, upon the rotation of the device, to gradually remove the settlings from the sloping bottom 13 into the sump 14; and at the same time it provides for the use of a filter bed cleaning machine 27 supported by a carriage 28 so as to be moved slowly in the clear effluent canal 29 adjacent the top surface of the filter bed 20 for cleaning the same and as well for removing the dirty liquid resulting from the cleaning operation. A clarification tank of this general type including a rotary scraper device 25 and means for operating the same is disclosed and described more fully in the application for Letters Patent of the United States, Serial No. 644,019, dated November 23, 1932, filed by Messrs. William C. Laughlin and Abraham B. Asch, and therefore needs no further description here except in so far as the same cooperates to complete the system of multiple-unit tanks or chambers herein disclosed. The filter bed 20 may, if desired, consist of magnetite or the like supported upon a suitable screen 30; and the filter bed cleaning machine 27 in order to cooperate with the magnetite bed may include an electro-magnet (not shown) for the efficient agitation and cleaning of the magnetite. A magnetite filter bed cleaning machine of this kind is illustrated and described in United States Letters Patent No. 1,872,759, dated August 23, 1932, granted to Messrs. William C. Laughlin and Abraham B. Asch, and needs no further description here. In this connection also, the observation may be made that the filter bed 20 may consist of sand or the like instead of magnetite, and in such case the filter bed cleaning machine may be provided with rakes or similar devices for stirring up and effecting the cleaning of the sand as more particularly illustrated in applications for Letters Patent of the United States Serial No. 553,527, filed July 28, 1931, and Serial No. 553,528, filed July 28, 1931, allowed November 17, 1932, respectively, in the name of William C. Laughlin and Abraham B. Asch.

Returning now to the sedimentation chambers, a, b and c, it will be seen that each of these chambers is divided by a baffle wall 31 into a downflow part or section a', and an upflow part or section a''. Each of the baffle walls is vertically disposed and extends entirely across the interior of its chamber from the front wall 32 of the structure to the rear wall 33 thereof; and in respect to depth, it extends downwardly from a horizontal screen 34 located a distance above the sewage liquid level 35, to a point preferably just within the bottom portion or sludge compartment 36 which is formed by the sloping walls 12. The purpose and object of this arrangement are to provide for a gentle, continuous stream flow of sewage liquid through the multiple-unit tanks or chambers, with the sewage liquid entering through an inlet 37 into the downflow section a' of the sedimentation chamber a and with the clear effluent discharging from the canal 29 above the filter bed through outlets as 23 into the launder 24. For this purpose, a suitable opening 38 leads from the upper portion of the up-flow section a'' of the sedimentation chamber a into the upper portion a' of the sedimentation chamber b; and in a similar manner, an opening 39 provides for the flow from the upper portion a'' of sedimentation chamber b into the upper portion a' of sedimentation chamber c. The inlet of pipe 16 leading from the section a'' of sedimentation chamber c to the liquid head 15 is preferably located at a somewhat lower level than the openings 38 and 39, as shown. In this arrangement, it will be manifest that the streamflow for each of the sedimentation chambers a, b, and c must pass downwardly through the section a and underneath the baffle wall 31 which brings the flow practically in the upper portion of the sludge compartment, whence it rises through the section a'' to the outlet leading to the next succeeding unit.

Each of the screens 34 is disposed in its chamber in a horizontal position spaced a distance above the level 35 in order to provide an air chamber 40 intervening between the liquid level and the screen and open to the atmosphere through the provision of suitable relatively large apertures 41. By referring to the drawings, it will be seen that the apertures 41 for the air spaces of chambers 40 are at either side of each baffle wall 31 and both in the front and rear walls 32 and 33 respectively of the structure. This arrangement provides for a free circulation of air in contact with the surface of the liquid in the chambers and for the flow of currents of air upwardly through the screens and for additional purposes which will presently appear.

Located in the upper portion of each sedimentation chamber and upon the screen 34 is a culture-growth bed which may be composed of a mass of trap-rock 42 or other material suitable for the growth and development of bacterial cultures and cell-division. This trap-rock naturally affords numerous air gaps and crevices for the habitation and development of the cultures, provides for a downwardly film-flow action of activated sludge which may be distributed upon and over the trap-rock, and also provides for the oxidation of film-flowing sewage or sludge and the growing microscopic organisms, which are aerobic in action and constitute of themselves good oxygen carriers. For present purposes, the rocks of each culture-growth bed are constantly filmed over by a supply of sewage or sludge taken from the bottom portion of a sedimentation chamber. Thus, in the present embodiment, for each unit comprising a sedimentation chamber and a trap-rock bed, there is provided a sludge suction or withdrawal line 43 the ingress end 43′ of which, within the sludge compartment, is pointed toward the bottom 11, this line extending through the rear wall of the structure to a suitable pump 44 located in an open chamber 45. The line 46 at the discharge side of the pump extends to a rotary sprinkler device comprising a hollow cylinder 47 suitably mounted for rotation upon a cross piece 48 which is supported by the walls of the structure immediately above the trap-rock. The hollow cylinder 47 carries a plurality of radially extending pipes 49 each of which is equipped with a plurality of nozzles 50. It will be noted that the nozzles of the pipes associated with the sprinkler are pointed in the same direction so that the reaction caused by the sludge gushing from the nozzles will force the pipes backwards and give to the whole sprinkler a rotary motion. In this way, the motion of rotation is generated automatically from the force of the discharge produced by the pump. The sewage or sludge gushing from the nozzles is broken up in the atmosphere so as to absorb oxygen and this broken-up material films over the rocks as it passes downwardly through the air gaps and crevices to provide nourishment for the growth and cell-division of the microscopic organisms finding habitat therein. It will be recognized that as the sewage or sludge films downwardly over the rocks it is constantly in contact with the currents of air passing through the air gaps and crevices so as to continue the absorption of oxygen. It will also be recognized that by the film-flow action of this material, masses of cultures are gathered thereby so as to be carried downwardly through the crevices of the screen and thence through the open air chamber 40 in which contact with the atmosphere is continued. The filming action material with the masses of microscopic organisms, which of themselves are good oxygen carriers, finally falls into the sewage liquid moving through the sections $a'$, $a''$ for thorough dissemination therein. By this arrangement, dissolved oxygen in copious quantities is constantly being carried into the bulk of the flowing sewage whereby to effect rapid fermentation, and since under this arrangement there is no exhaustion of the dissolved oxygen supply, there is no danger of producing putrefactive products.

It will be recognized that the inlet end of the withdrawal line 43 need not necessarily confront the bottom of the sludge compartment and need not necessarily be in close proximity to the bottom thereof; for in practice it may be in a location and at an elevation suitable for withdrawing sewage as well as sludge, or even located so that the material withdrawn will consist entirely or almost entirely of sewage. The sludge and particularly the deeper strata thereof may, in certain instances and under some conditions of treatment, be wanting in bacterial life or in enlivened bacteria, so that it will be necessary to withdraw the supply for the film-flow action at that point, place or elevation where the material will have gathered therein the greatest numbers of active bacterial growth.

At this point, it may be mentioned that either before the sewage liquid is introduced through the inlet 37 or within the sedimentation chamber $a$, or in any of the succeeding chambers, I may introduce any suitable materials or substances which will have a chemical reaction upon the contents of the sewage or liquid so as to rapidly produce a precipitate having coagulating properties with respect to the colloids and suspended substance for separating from the liquid such colloids and all matter held in suspension. For the purpose of forming a precipitate which acts as a coagulant to hasten sedimentation and which will also assist in clarification, I may employ to advantage the materials and substances comprising the method of sewage treatment disclosed in Letters Patent of the United States, No. 1,877,623, granted September 13, 1932, to William C. Laughlin. The stream flow of sewage liquid passing from one chamber to another in succession is rapidly invaded by the bacterial cultures which protect it from putrefaction.

With the flowing sewage liquid receiving in each of the sedimentation chambers and each of the sections $a'$, $a''$ thereof fresh supplies of dissolved oxygen, re-oxidized sewage or sludge and masses of fresh bacterial cultures, practically all of the colloids will undergo chemical changes to assist or hasten sedimentation. The sewage and sludge are constantly in contact with dissolved oxygen and are, therefore, in constant activation, with fresh cycles of bacterial cultures acting as a ferment for accelerating the desired chemical changes naturally effected by meeting the oxygen demand of the sewage. The culture beds play an important part in this, not only in initiating new cycles of cell-growth, division and assimilation, but also in acting as oxygen carriers which are constantly being disseminated through the bulk of the sewage. Under the arrangement activated sludge is, after a manner of speaking, kept built up so that its properties of absorbing and flocculating the suspended and colloidal solids are maintained in a state of high efficiency. It will be appreciated that the lighter liquor passes in the stream flow from one zone of flocculation to the next succeeding zone, becoming as it flows from zone to zone more and more clear, with the result that after passing through the filter bed in the clarification tank, the final liquor effluent will be clear and fit, upon chlorination or similar treatment, to be passed into running streams or for other disposition. The settlings which are scraped into the sump 14 may be withdrawn through a suction pipe 51 and conveyed to a filter as these settlings are in condition for rapid filter pressing and drying into cakes or the like.

It will be recognized by those familiar with this art that in the use of my apparatus and in accordance with my system herein disclosed, there will be a constant biological flocculation of the suspended and colloidal substances contained in the sewage in each chamber, it of course being well known in the art that when suspended and colloidal solids are kept in contact with an abundance of oxygen, the sewage assumes a flocculent appearance. The bacterial cultures grown in the culture-growth beds, gather and grow in the flocculi in great numbers, so that a flocculation process as well as an oxidation process is always under way. The bacterial cultures are kept in continuous contact with atmospheric or dissolved oxygen, very much like the natural purification taking place in a flowing stream where the oxygen demand is constantly satisfied through absorption due to continuous breaking up and mixing of the liquid.

An important advantage of my apparatus and system is that it practically eliminates the passage of any green sludge or liquid into the clarification tank; and it provides a uniform rate of flow, with the fresh sewage and solids being admitted at a rate to maintain an effective ratio of fresh to ripe sludge. In the copious clarification chamber 18, any colloids and fine sediment which may have been carried thereto, are given ample opportunity to precipitate, and any colloidal matter or other sediment which does not settle to the bottom of the clarification chamber 18 will be removed in passing upwardly through the filter bed 20, and inasmuch as the filter bed cleaning machine 27 is constantly engaged in cleaning the filter bed and removing the dirty liquid resulting from the cleaning operation, only clear liquor, substantially free of impurities, rises for discharge through the outlets 23 into the launder 24. The clear liquor which thus reaches the launder 24 may be finally disposed of by passing it into flowing streams or it may be given any other disposition as may be desired.

As many changes could be made in the above construction and many apparently widely different embodiments of this invention could be made without departing from the scope thereof, it is intended that all matter contained in the above description and shown in the accompanying drawings shall be interpreted as illustrative and not in a limiting sense. Moreover, the terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:—

1. A sewage treating apparatus comprising a sedimentation chamber and a culture-growth bed, the latter being disposed a spaced distance above the former and between side walls comprising upward extensions of the side walls of the chamber, together with means for pumping activated sludge from the chamber and spraying the same over the top of the bed to produce a film-flow action down through the bed and thence into the chamber, said bed comprising relatively coarse material affording numerous passages for the culture-growth and film flowing sludge and for the circulation of air whereby to aerate the same, and lateral openings in said side walls providing direct communication between the outside atmosphere and the space intervening between the chamber and bed.

2. In apparatus for treating sewage including a sedimentation chamber, the side walls of which extend upwardly relatively high above the sewage level of the chamber, a culture-growth bed disposed to discharge into the chamber and comprising relatively coarse material having numerous passageways for the growth and cell-division of cultures and exposed to the air, said material filling the space between the upwardly extending side walls, and means for pumping sludge from the chamber and spraying the same over the top of the bed to produce a film-flow of the sludge to contact the cultures and air in said passageways prior to being discharged from the bed.

3. In combination with a vessel the walls of which provide a sewage sedimentation chamber in the lower portion of the vessel, having lateral openings to the outside atmosphere in a plane above the sewage surface, a bed filling the space between the walls in the upper portion of the vessel, its bottom being substantially above the plane of said openings whereby to provide an open air space open to the outside atmosphere between the surface of the sewage and the bottom of the bed, said bed comprising relatively coarse material forming passageways for the growth and cell-division of cultures, means for conveying activated sludge from the chamber and distributing it over the bed to produce a film-flow downwardly through the passageways in contact with the cultures and thence to film through said open air space and into the sewage for dissemination through the bulk of the sewage.

4. In a sewage treating system, the combination of a sedimentation chamber having between its side walls a culture-growth bed permeable to air and sludge the bottom of the bed being at a level above the level of the sewage in the chamber, to provide an intervening space, there being lateral openings in the side walls providing direct communication between the outside atmosphere and said intervening space, a baffle wall dividing the chamber into downflow and upflow sections in open communication at their lower ends and both open at their upper ends to said open air space, an inlet for sewage in the upper part of the downflow section, an outlet for liquor in the upper part of the upflow section, a device for distributing sludge upon said bed to pass downwardly therethrough and through said open air space into said sections, and means for conveying activated sludge from said chamber to said distributing device.

5. The combination with a vessel containing a sedimentation chamber and having an inlet and an outlet to said chamber, of a baffle wall dividing the chamber into a downflow section adjacent the inlet and an upflow section adjacent the outlet, said sections being in communication adjacent the bottom of the chamber to provide for stream flow through the chamber, a culture-growth bed disposed in the vessel above the liquid level of said sections and permeable to air and sludge, and means for passing activated sludge in a film-flow action downwardly through said bed to be received in the stream flow through said chamber.

6. Sewage treatment apparatus having an open air gap between an overhead culture-growth bed and the sewage level of a sedimentation chamber, a partition dividing said chamber into a downflow section and an upflow section in communication through a sludge compartment below the partition, together with means for causing a flow of sewage through said sections and intercommunicating compartment, and means for conveying activated sludge from the flow at said compartment and passing the same through said bed in a film flow action to fall by similar action through said air gap for deposit in said sewage.

7. In a multiple-unit sewage treatment apparatus in which each unit includes a sedimentation chamber and a culture-growth bed located above and discharging into the chamber, relatively small passages connecting the chambers of the units, a rotary sprinkler arranged above and discharging upon each bed, means to convey activated sludge to each sprinkler for discharge thereby upon the corresponding bed of that unit, to provide for the growth and cell-division of the cultures and also for removing portions of the cultures with the discharge from the bed into the particular chamber of that unit, and means for maintaining a flow of sewage through the chambers, passing through the relatively small passages from one chamber to another in succession for receiving the discharge from the beds of the units.

8. In a sewage treatment apparatus which includes a chamber formed by a bottom wall and upwardly extending side walls, an inlet and an outlet in opposing side walls, located at an elevation above the bottom, means for maintaining a constnt flow of sewage through the chamber, entering through the inlet and discharging through the outlet, baffle means within the chamber causing the flow therein to move downwardly from the inlet toward the bottom and thence upwardly from the bottom to the outlet whereby to retard the flow and permit rapid deposit of sediment upon the bottom, and means supported within the encompassing side walls of the chamber above the level of the maintained sewage flow therein for constantly dribbling re-vitalized sludge downwardly into the whole range of sewage flow moving through the chamber.

WILLIAM C. LAUGHLIN.